United States Patent [19]

Kaufman et al.

[11] Patent Number: 4,812,826
[45] Date of Patent: Mar. 14, 1989

[54] THERMAL SENSOR FOR DETECTION OF RAILROAD BEARING FAILURES

[75] Inventors: William M. Kaufman; Alberto Guzman, both of Pittsburgh, Pa.

[73] Assignee: Carnegie-Mellon University, Pittsburgh, Pa.

[21] Appl. No.: 31,236

[22] Filed: Mar. 26, 1987

[51] Int. Cl.$^4$ .................. G08B 21/00; G08B 17/04; B61K 1/00
[52] U.S. Cl. .................. 340/682; 246/169 A; 340/539; 340/592
[58] Field of Search .......... 340/682, 584, 590–592, 340/539; 246/169 A; 116/216, DIG. 38; 343/889

[56] References Cited

U.S. PATENT DOCUMENTS

| | | | |
|---|---|---|---|
| 3,442,249 | 5/1969 | Jamison et al. | 246/169 A |
| 3,737,912 | 6/1973 | Cribb | 343/889 X |
| 3,792,434 | 2/1974 | Williams | 246/169 A X |
| 3,924,687 | 12/1975 | Groos | 169/19 |
| 3,930,629 | 1/1976 | Armstrong et al. | 246/169 A |
| 4,119,284 | 10/1978 | Belmont | 246/169 A |
| 4,223,646 | 9/1980 | Kinder | 123/41.11 |
| 4,265,603 | 5/1981 | Chiyoda et al. | 340/682 X |
| 4,311,653 | 1/1982 | Kushida | 261/39 A |
| 4,483,287 | 11/1984 | Monigold et al. | 123/198 DB |
| 4,501,006 | 2/1985 | Korenberg | 340/682 X |

Primary Examiner—Glen R. Swann III
Assistant Examiner—Thomas J. Mullen, Jr.
Attorney, Agent, or Firm—Reed Smith Shaw & McClay

[57] ABSTRACT

A thermal sensor composed of a standard bolt which has been modified to embody a temperature sensing element and placed into a bearing assembly of a train. This element contains a heat-sensitive wax that at a preset temperature expands causing the motion of a piston which exposes projections. The projection may function as an antenna either passive (reflective) or active (transmitter) that can be probed from the wayside with very high selectivity.

6 Claims, 3 Drawing Sheets

THERMAL SENSOR FOR DETECTION OF RAILROAD BEARING FAILURES

FIELD OF THE INVENTION

The present invention relates to sensors that detect the failure of bearings. More specifically the present invention relates to thermal sensors using a wax-activated device to indicate when the temperature of a bearing has reached a level indicative of potential failure in the bearing.

BACKGROUND OF THE INVENTION

Overheated bearings on railroad vehicles are the results of incipient bearing problems that may lead to catastrophic failures with the undesirable effect of a train derailment. Therefore, detection of bearing problems in time to replace the bearing before axle failure occurs has been of great interest to the railroad industry. Various methods have been proposed for the detection of troubled bearings, including infrared detectors, devices containing a shape-memory material, fusible materials and more recently acoustical spectral analysis. Perhaps the major concern of the railroad industry is the reliability of these detectors. False alarms result in unnecessary train stops. Data reported by the Santa Fe Railroad in the April 1986 Symposium on Railroad Bearing Failure, (C. R. Kaelin, Railroad Bearing Failure Detection and Diagnosis Symposium, 1986, University of Illinois), held at the University of Illinois, showed that hot box (hot bearings) detectors (**189 are owned by Santa Fe) caused 10517 train stops during 1985. 42% of these stops were attributed to false alarms.

Hot box detectors using infrared sensing are presently representative of the state-of-the-art of the detection technology (S. Russo (GRS) and J. E. Bambara (Servo Corp.), Railroad Bearing Failure Detection and Diagnosis Symposium, 1986, University of Illinois). The core of the detector is a radiometer and associate optics that focus and measure the infrared energy radiated from the wheel journal. In addition, the detector has an electronic module for signal processing, a shutter to protect the IR sensor from undesired stray infrared radiation and other components to prevent accumulation of dust, snow or water on the optical surfaces and the sensor. Even though this technology has advanced substantially in recent years, still these detectors have not reached a high reliability level. Measuring the interior temperature of a bearing requires a precise determination of the exterior temperature of the bearing. This implies a good knowledge of the surface emissivity characteristics of the exterior surface of the bearing. These characteristics could vary extensively due to the presence of rust, dirt, grease or other undesirable coatings, thus making the determination of the interior temperature of the bearing very imprecise. Another source of false alarms given by these type of detectors are hot wheels and not hot bearings. The issue of standardization of the IR scanners also seems to raise some concern among various users.

A system to prevent train derailment due to axle failure resulting from bearing overheating was the subject of two U.S. Pat. Nos. 3,930,629 and 4,029,859 issued in 1976 and 1977 respectively (U.S. Pat. Nos. 3,930,629 of J. H. Armstrong and F. C. Kluge; and 4,029,859 of J. H. Armstrong and F. C. Kluge). Also, a System for Train Accident Reduction (DOT-STAR) was described during the 34th meeting of the Mechanical Failures Prevention Group held at the National Bureau of Standards in October of 1981 (J. J. Richardson, Proceedings of the 34th Meeting of the Mechanical Failures Prevention Group, NBS, October, 1981). These systems have in common a thermal sensor that has an active element made of Nitinol, a nickel-titanium alloy that has shape-memory. This element acts as a trigger to release a firing pin upon generation of a hot bearing. The firing pin in turn initiates actions that result in puncturing and venting the brake line to stop the train automatically. Such systems have not been adopted by the railroad industry. It seems that the major negative aspect of these systems is that stopping the train is a decision to be made by the train crew and not by an automatic alarm. Suddenly throwing the train into an emergency stop is, itself, a hazardous operation. The sensing and stopping system is a rather expensive item to add to each wheel of a freight car.

Another system for prevention of roller bearing-initiated burnoffs was developed by SKF Industries under the sponsorship of the U.S. Department of Transportation. The results of this work were reported in 1979 (G. E. Allen, J. R. Lucas, F. H. Tomlinson, Report No. DOT-TSC-FRA-79-5, January, 1979) by Allen, Lucas and Tomlinson. The SKF's concept uses a "transmitter bolt" which, when substituted for a standard axle cap bolt, would sense excessive bearing operating temperature and signal the train crew in time to prevent derailment. The "transmitter bolt" is composed of an implanted transmitter, an antenna and a thermoelectric power source to operate the transmitter. The report also estimated a cost which is higher than acceptable to the railroad industry. SKF replaced the thermoelectric power source with a battery and sensed temperature with a temperature sensitive resistor. Although the concept was demonstrated by SKF, the question of surviveability and longevity of the major subsystem (battery, thermal switch and transmitter) was not answered.

Analysis of the spectrum of acoustical signals emitted by rolling element bearings was proposed during the 1950's. However, it has not been until recently when progress in electronics has made it possible to analyze in "real-time" dominant harmonics of signals that are generated by bearings with operational failing symptoms (J. Frarey and R. Smith (Shaker Research Corp.), Railroad Bearing Failure Detection and Diagnosis Symposium, 1986, University of Illinois). The acoustic signature of a bad bearing is quite different than that produced by a healthy bearing. A defective bearing can create noises that will give a distinct acoustical spectrum. The character of the spectrum may change as a defect progresses toward failure and this information might be used to prevent a catastrophic failure. However, the task of diagnosing the "signature" of a bearing operating under abnormal conditions is quite difficult. Correlating the sound pattern emitted by a defective bearing with the type of failure mode and the amount of internal damage will require an intensive research program. This technology is in its early stages, and it is premature to evaluate whether it will offer an alternate safe method for incipient bearing failure detection.

Another approach, and the approach used herein, takes advantage of the fact that during normal operation a railroad car bearing generates a certain amount of heat due to friction among the moving parts in the bearing assembly which results in a temperature rise above the ambient temperature. The operating bearing temperature is a function of the rotational speed, lubricant viscosity and the applied load on the bearing. If the integrity of the bearing is altered by any external or internal causes (e.g., corrosion, mechanical damage, fatigue, component wear, etc.) the resulting effect is the generation of additional heat and the subsequent temperature increase. Thus, it seems that a good correlation exists between bearing temperature and incipient failure. An overheated bearing may not lead to a catastrophic failure immediately, but is a good indicator that there is something wrong and that extreme caution must be exerted. Besides, excessive heat may cause lubrication problems due to decomposition of the lubricant thus triggering a chain effect that may cause the bearing burn-off. A systematic study of the progression of various failure scenarios and the correlation with temperature excursions is needed. However, experience tells that there is a certain threshold perhaps between 250° and 300° F. that is indicative of potential bearing problems.

The spatial temperature distribution in a roller bearing assembly can be predicted using computer models as the one described by Reason and Schwarz. Their study shows that a viable computer program based on analytical heat transfer techniques may be constructed which is capable of predicting temperature distributions in rolling contact bearing assemblies. They also demonstrated that the predicted results yield a close correlation with experimentally measured values. In addition, valuable data on bearing temperatures during railroad car operation under various conditions have been reported by Peacock and Snider of the Naval Surface Weapons Center (T. V. Peacock and H. H. Snider, NTIS report #FRA/ORD-80/43, 1980). A preliminary evaluation of the data presented by these researchers seems to indicate that the bolt/sensor combination proposed herein is appropriate because it places the thermal sensor in an almost ideal position. This is shown in the cross section of a roller bearing assembly 100 (FIG. 1) holding an axle 110. The drawing reveals that a short distance separates the bolt's 102 body from the inner race 104. Since the heat generated by the bearing 106 is mostly transferred to the bolt 102 by solid conduction along a high thermal conductivity path, it is valid to assume that the temperature differential between the inner race 104 and the bolt 102 will be very small and the time lag for heat transfer quite short.

A single thermal sensor may be used to indicate that the upper temperature limit has been reached. However, since there are three bolts supporting the bearing end cap cover plate, three temperature limits may be preset. The advantage of an array of sensors over one single sensor is that additional information on the "rate of heating" may be obtained. These three levels of temperature sensing might provide some means of evaluating bearing performance between contiguous wayside detection stations. The use of an "intelligent" heat sensing system may reduce or even eliminate false alarms.

SUMMARY OF THE INVENTION

Accordingly, one object of the present invention is to provide an intelligent thermal sensor that indicates a potential for failure of a bearing.

Another object of the present invention is to provide a thermal sensor that uses a wax motor that activates within a narrow predetermined temperature range to bring attention to an associated bearing that indicates a potential for failure of the bearing.

Another object of the present invention is to provide an active thermal sensor that alerts users there may be the potential for failure of an associated bearing.

Another object of the present invention is to provide a passive thermal sensor that alerts users that there may be the potential for failure of an associated bearing.

These and other objects of the present invention are accomplished with a thermal sensor for the detection of bearing failure comprising: a bolt having a head, center and an end, said bolt having a hole through the head and center and closed at the end; means for detecting when a certain temperature is reached in the bolt, said detecting means disposed in the hole of the bolt; means of notifying when a certain temperature has been detected, said notifying means disposed in the hole of the bolt and activated by the detecting means.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
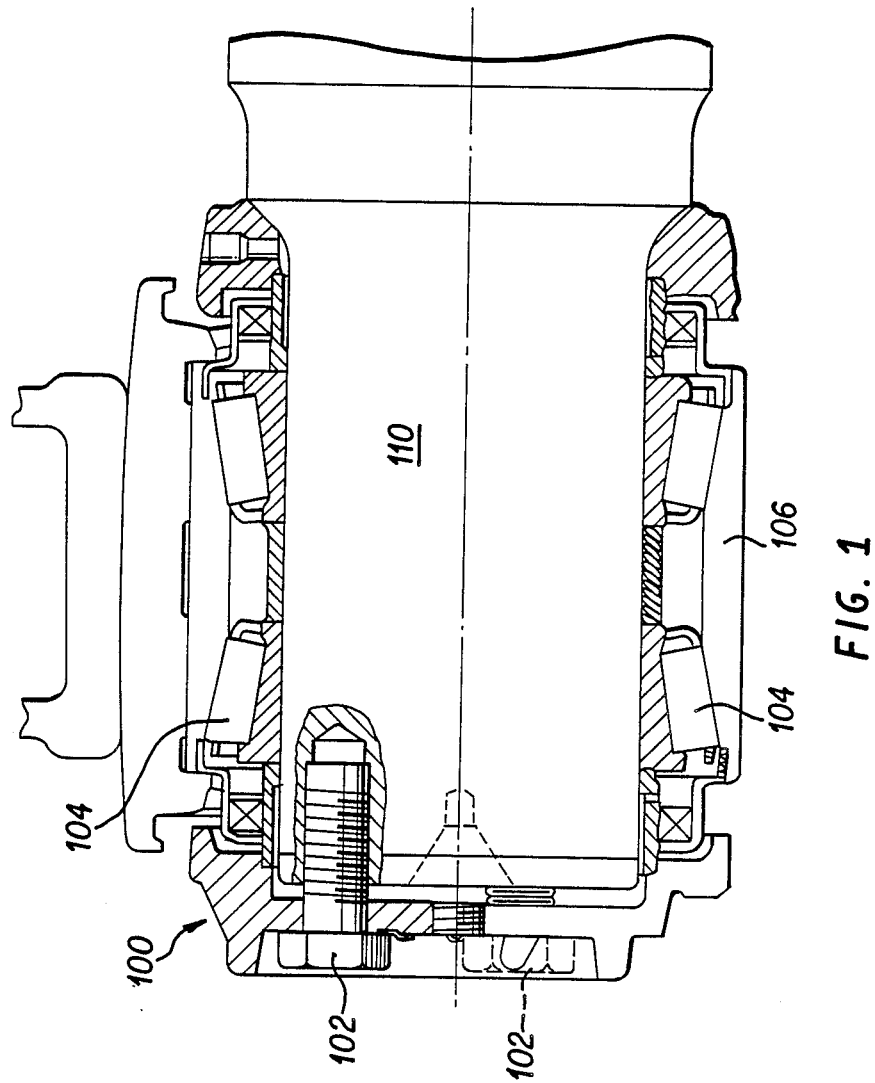
FIG. 1 is a cross-section of a roller bearing assembly.
Figure 2:
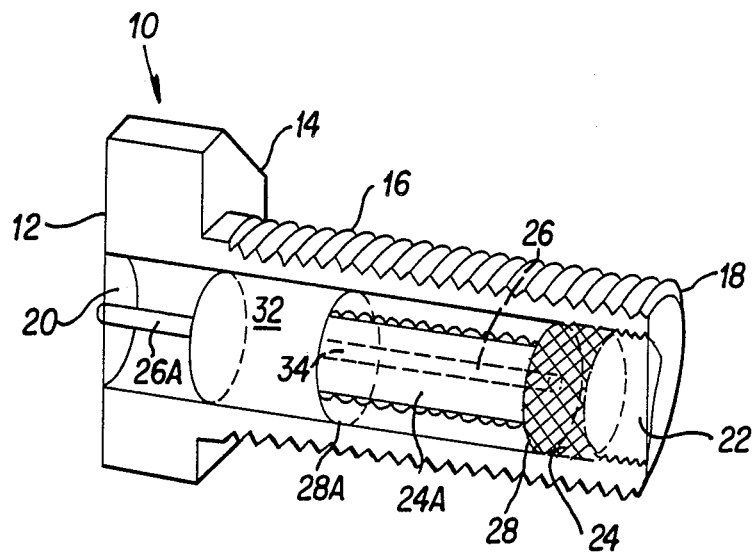
FIG. 2 is a cross-section of a bolt/sensor assembly.

Referring now to the drawings, wherein like reference numerals designate identical or corresponding parts throughout the several views, and more particularly to FIG. 2 thereof, a detector for the determination of bearing failures is illustrated in the form of thermal bolt/sensor 10.

The thermal sensor 10 is composed of a standard bolt 12 which has been modified to embody the temperature sensing element. This element contains a heat-sensitive wax 24 that expands within a preset narrow temperature range causing the motion of a piston 28 which exposes projections 26. The projection 26 may function as an antenna 26, either passive (reflective) or active (transmitter) that can be probed from the wayside with very high selectivity.

More specifically, the thermal sensor 10 is comprised of a bolt 12 having a head 14, center 16 and an end 18. The bolt 12 has a hole 20 through the center 16 and a plug 22 at the end 18 of the bolt 12 sealing the hole 20. Torque specifications require that the bolt 12 must be able to sustain up to approximately 500 ft-lb (unlubricated condition). A standard bolt has to be internally modified to accommodate the sensing elements. A bolt having a hole 20 in the center 16 has a lower tensile strength than the solid counterpart. The maximum tensile load supported by a hollow bolt 12 can be calculated approximately using the equation:

$$P_T = (A_T - A_H) T_T$$

where:
$P_T$ = tensile load, (lbs)
$A_T$ = tension are, (sq. in.)
$A_H$ = hole area, (sq. in.)
$T_T$ = tensile strength (psi)

The tensile load resulting from the applied torque must not exceed the maximum limit. In order to compensate for the degradation of strength caused by the presence of a hole 20 in the body of the bolt/sensor 12, it may be necessary to increase the material tensile strength over the present value. Alloy steels such as the AISI 4340 or equivalent alloys may be used.

As discussed above, the temperature in the bearing assembly 100 is indicative of the integrity of the bearing. Means 24 for detecting when a certain temperature is reached, for example 250° C. to 350° C., in the bolt 12 is disposed in the hole 20 of the bolt 12. The detecting means can be, for example, a wax motor 24, shown in a non-actuated position as the thatched area of FIG. 2. The wax motor 24 utilizes a heat-sensitive wax formulated to expand within a precise narrow temperature range. The temperature range of activation of the motor is selectable by selecting the wax formulation. The wax motor can, of course, be situated anywhere throughout the bolt, such as along the circumferential surface surrounding the hole 20. When the wax motor expands, it exerts a force upon the piston to which it is connected. What is important is that a force is supplied to the piston 28, causing it to move towards the head 14 of the bolt 12.

Any detecting means 24 can suffice that detects a certain temperature in the sensor 12 and supplies a force to cause means to notify 26 users of the bearing that there is a potential for failure in the bearing as indicated by the sensed temperature. The notifying means 26, located in hole 20, for example, can be comprised of a piston 28 with an attached antenna 26. Such notification is premised on the antenna 26 protruding from the head 14 of the bolt 12. In the operation of the invention, when the pre-chosen temperature is reached in the bolt 12, the wax in the motor 24 expands, causing the piston 28 to move towards the head 14 of the bolt 12. The antenna 26 then protrudes from the head 14 of the bolt 12. Referring to FIG. 2, the wax motor 24A is shown in its extended form, where it has expanded and no longer is compressed in the thatched region. The antenna 26 (shown with crossed lines) moves to position 26A when the wax in the motor 24 expands as does the piston 28 to position 28A.

In a passive mode, the antenna 26A protruding from the head 14 of the bolt 12 triggers a device such as a light beam or a radar detector that is positioned appropriately alongside the path of, for instance, a train. As is well known with such devices, by the antenna 26A passing through the radar or light beam or equivalent, a signal is triggered. As long as the antenna 26 is not protruding, the passive detector devices are not triggered.

Figure 3:
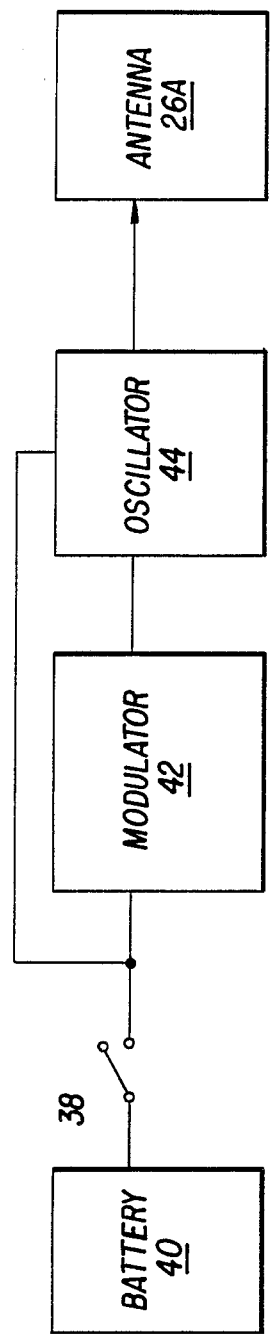
FIG. 3 is a schematic diagram of an electronic module.

An electronic module 32 that produces a radio signal can be used in an active mode of the sensor 10. The module 32 is located in the hole 20 of bolt 12 between the bolt head 14 and the piston 28. The module 32 has a hole 34 through which the antenna 26 passes when the wax motor 24 expands and pushes against the piston 26. When the antenna 26 passes through the module 32, the module 32 becomes activated and emits a radio signal that is delivered to a receiver (not shown) via the antenna 26, thus alerting a user to the possibility of a problem with the bearing 106. The module can be comprised of, for instance (see FIG. 3), a switch 38 that is turned on as the antenna 26 moves through the module 32 causing electricity from a battery 40 therein to power an oscillator 44 and a connected modulator 42 to produce the signal also situated therein. The signal can be of a precoded form to specifically identify that a bearing may be defective.

Obviously, numerous (additional) modifications and variations of the present invention are possible in light of the above teachings. It is therefore to be understood that within the scope of the appended claims, the invention may be practiced otherwise than as specifically described herein.

We claim:

1. A thermal sensor for detection of bearing failures comprising:
    a bolt having a head, center and an end, said bolt having a hole passing through the head and center and closed at the end;
    a piston having a first side and a second side situated inside the hole of said bolt;
    means for detecting when a certain temperature is reached in the bolt, said detecting means disposed in the hole of the bolt and connected to the first side of the piston; and
    an antenna disposed in the hole of the bolt and attached to the second side of the piston wherein, when the detecting means detects that a certain temperature on the bearing is reached, it forces the piston towards the head and causes the antenna to protrude from the head of the bolt.

2. A thermal sensor for detection of bearing failures comprising:
    a bolt having a head, center and an end, said bolt having a hole through the head and center and closed at the end;
    a piston having a first side and a second side situated inside the hole of said bolt;
    a wax motor located in the hole of the bolt and connected to the first side of the piston; and
    an antenna disposed in the hole of the bolt and attached to the second side of the piston, said piston situated between the antenna and the wax motor, wherein when the wax motor expands after a certain temperature in the bearing is reached, it forces the piston towards the head and causes the antenna to protrude from the head of the bolt.

3. A sensor as described in claim 2 including an electronic module that produces a radio signal, said module located in the hole of the bolt and adjacent the second side of the piston such that the piston is between the module and the wax motor, said module having a hole through it that allows the antenna to pass therethrough, said module becoming activated and emitting the radio signal through the antenna when the wax motor expands causing the antenna to slide through the hole in the module.

4. A sensor as described in claim 3 wherein the module has a switch that is turned on when the wax motor expands and the antenna slides through the hole in the module, causing electricity to flow from a battery and power an oscillator and a connected modulator, said oscillator then sending a radio signal through the antenna, said battery, oscillator and modulator housed in said module.

5. In a roller bearing assembly having an inner race housing an axle, with the assembly secured to the axle by three bolts, the improvement comprising:
    each bolt having a head, center and an end, each said bolt having a hole through the head and center and closed at the end;

a piston having a first side and a second side situated inside the hole of each said bolt;

three distinct wax motors, each wax motor expanding at a different temperature, each wax motor located in the hole of a different one of the bolts and connected to the first side of the piston; and an antenna disposed in the hole of each said bolt and attached to the second side of the piston wherein when the wax motor melts, it forces the piston towards the head and causes the antenna to protrude from the head of the bolt.

6. An assembly as described in claim 5 wherein each bolt also has an electronic module that produces a radio signal, said module located in the hole of the bolt, and adjacent the second side of the piston such that the piston is between the module and the wax motor, said module having a hole through it that allows the antenna to pass therethrough, said module becoming activated and emitting the radio signal when the wax motor expands causing the antenna to slide through the hole in the module.

* * * * *